(12) United States Patent
Ehara et al.

(10) Patent No.: US 7,913,804 B2
(45) Date of Patent: Mar. 29, 2011

(54) ELECTRIC POWER STEERING SYSTEM

(75) Inventors: Shigeki Ehara, Wako (JP); Hiroyuki Tokunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 12/406,375

(22) Filed: Mar. 18, 2009

(65) Prior Publication Data

US 2009/0266641 A1  Oct. 29, 2009

(30) Foreign Application Priority Data

Apr. 23, 2008  (JP) .................. 2008-112061

(51) Int. Cl.
*B62D 5/04* (2006.01)

(52) U.S. Cl. .......................... 180/446; 701/42

(58) Field of Classification Search ................. 180/443, 180/446; 701/41, 42
See application file for complete search history.

(56) References Cited

U.S. PATENT DOCUMENTS

| 6,671,597 B2 * | 12/2003 | Kada ............................... 701/41 |
| 7,512,468 B2 * | 3/2009 | Tamaizumi et al. ............ 701/41 |
| 7,739,001 B2 * | 6/2010 | Kato et al. ........................ 701/2 |

FOREIGN PATENT DOCUMENTS

| EP | 1707473 A1 * | 10/2006 |
| JP | 2001-106108 A | 4/2001 |
| JP | 2003-220964 A | 8/2003 |
| JP | 2005-271877 A | 10/2005 |
| JP | 2007-099053 A | 4/2007 |

* cited by examiner

*Primary Examiner* — Kevin Hurley
(74) *Attorney, Agent, or Firm* — Arent Fox LLP

(57) ABSTRACT

In an electric power steering system for a vehicle that controls a force that urges a steering wheel toward a neutral position thereof, a control unit (21) for the system is configured such that an electric motor (9) for providing an assisting force produces a relatively large returning force when a rotational direction of a steering wheel (2) agrees with a direction of the steering torque applied to the road wheel (7), and a relatively small returning force when a rotational direction of the steering wheel disagrees from a direction of the steering torque applied to the road wheel. Thereby, the effort required for a vehicle operator to steer the vehicle is reduced and the steering feel can be thereby and otherwise improved while providing a favorable returning force that urges a steering wheel toward a neutral position.

4 Claims, 5 Drawing Sheets

ELECTRIC POWER STEERING SYSTEM

CROSS-REFERENCE TO RELATED APPLICATION

This application claims the priority of JP Application No. 2008-112061, filed Apr. 23, 2008, the entire specification, claims and drawings of which are incorporated herewith by reference.

TECHNICAL FIELD

The present invention relates to an electric power steering system, and in particular to an electric power steering system that controls a force that urges a steering wheel toward a neutral position thereof.

BACKGROUND OF THE INVENTION

In the field of electric power steering systems, it is known to improve the steering feel of a vehicle by appropriately controlling the force that urges the steering wheel toward the neutral position after making a turn.

The electric power steering system disclosed in Japanese patent laid open publication (kokai) No. 2003-220964 (patent document 1) comprises a power source for providing an actuating force to a vehicle steering mechanism, a steering angle detecting means for detecting the angular position of the steering wheel, a vehicle speed detecting means for detecting a vehicle speed and a self-aligning torque compensation means for compensating for any excess or deficiency in the self-aligning torque of the vehicle according to the steering angle detected by the steering angle sensor and the vehicle speed detected by the vehicle speed sensor, wherein the self-aligning torque is maintained at an appropriate level at all times by increasing a correction gain for the self-aligning torque when the vehicle speed is low and reducing the correction gain substantially to zero when the vehicle speed is medium or high.

According to another proposal disclosed in Japanese patent laid open publication (kokai) No. 2005-271877 (patent document 2), a steering system is provided with an actuator that can control the steering angle of road wheels, and controls the steering angle when returning the steered wheels back to the neutral position according to the magnitude of the steering angle immediately preceding the returning of the steered wheels.

Having conducted research in this field, the inventors have discovered that the steering feel of an electric power steering system that provides an assisting steering torque can be significantly improved by determining the returning force that urges the steering wheel toward a neutral position by taking into account if the direction of the steering torque agrees with the rotational direction of the steering wheel or not.

The prior inventions disclosed in patent documents 1 and 2 were directed to the control of the returning force that urges the steering wheel toward the neutral position, but did not consider the relationship between the direction of the steering torque and the rotational direction of the steering wheel. Therefore, according to the prior art, there was a problem that the returning force of the steering force tends to be excessive when the direction of the steering torque agrees with the rotational direction of the steering wheel, and this impaired the steering feel and/or unduly increased the effort required for effecting a steering action.

BRIEF SUMMARY OF THE INVENTION

In view of such problems of the prior art and the recognition by the inventors, a primary object of the present invention is to provide an electric power steering system that can control a force that urges a steering wheel toward a neutral position thereof in such a manner that the steering feel can be improved.

A second object of the present invention is to provide an electric power steering system that reduces the effort required for a vehicle operator to steer a vehicle while providing a favorable returning force that urges a steering wheel toward a neutral position.

According to the present invention, such an object can be accomplished by providing an electric power steering system, comprising: a steering mechanism for converting a rotational movement of a steering wheel to a steering movement of a road wheel; a steering torque sensor for detecting a steering torque applied to the road wheel; an electric motor for providing an assisting force for causing the steering movement of the road wheel; and a control unit for providing a control variable for the electric motor, the control unit including a target control base value determining unit for determining a target control base value for the electric motor at least according to a steering torque applied to the steering wheel, a correction value determining unit that modifies the target control base value so as to determine a returning force that urges the steering wheel toward a neutral position, and forwards the modified target control base value to a drive unit for the electric motor, wherein the correction value determining unit modifies the target control base value so as to cause the electric motor to produce a relatively small returning force when a rotational direction of the steering wheel agrees with a direction of the steering torque applied to the road wheel, and a relatively large returning force when a rotational direction of the steering wheel disagrees from a direction of the steering torque applied to the road wheel.

Thereby, the effort required for a vehicle operator to steer the vehicle is reduced and the steering feel can be thereby and otherwise improved while providing a favorable returning force that urges a steering wheel toward a neutral position.

According to a preferred embodiment of the present invention, the system further comprises a steering angle sensor for detecting a steering angle of the steering wheel, and the correction value determining unit is configured such that the returning force produced by the electric motor is substantially proportional to the steering angle of the steering wheel when the steering angle is smaller than a prescribed value, and is substantially constant when the steering angle is greater than the prescribed value. Thereby, a suitable restoring force acts upon the steering wheel without unduly increasing the effort required by the vehicle operator to turn the steering wheel.

When a vehicle operator desires to rapidly turn the steering feel as evidenced by a high steering angle velocity, it is advantageous to reduce the returning force acting upon the steering wheel. Based upon this recognition, according to a certain aspect of the present invention, the correction value determining unit is configured such that the returning force produced by the electric motor is reduced with an increase in a steering angle velocity of the steering wheel when a rotational direction of the steering wheel agrees with a direction of the steering torque applied to the road wheel at least in a range of the steering angle velocity, preferably only when the steering angle velocity is greater than a prescribed value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
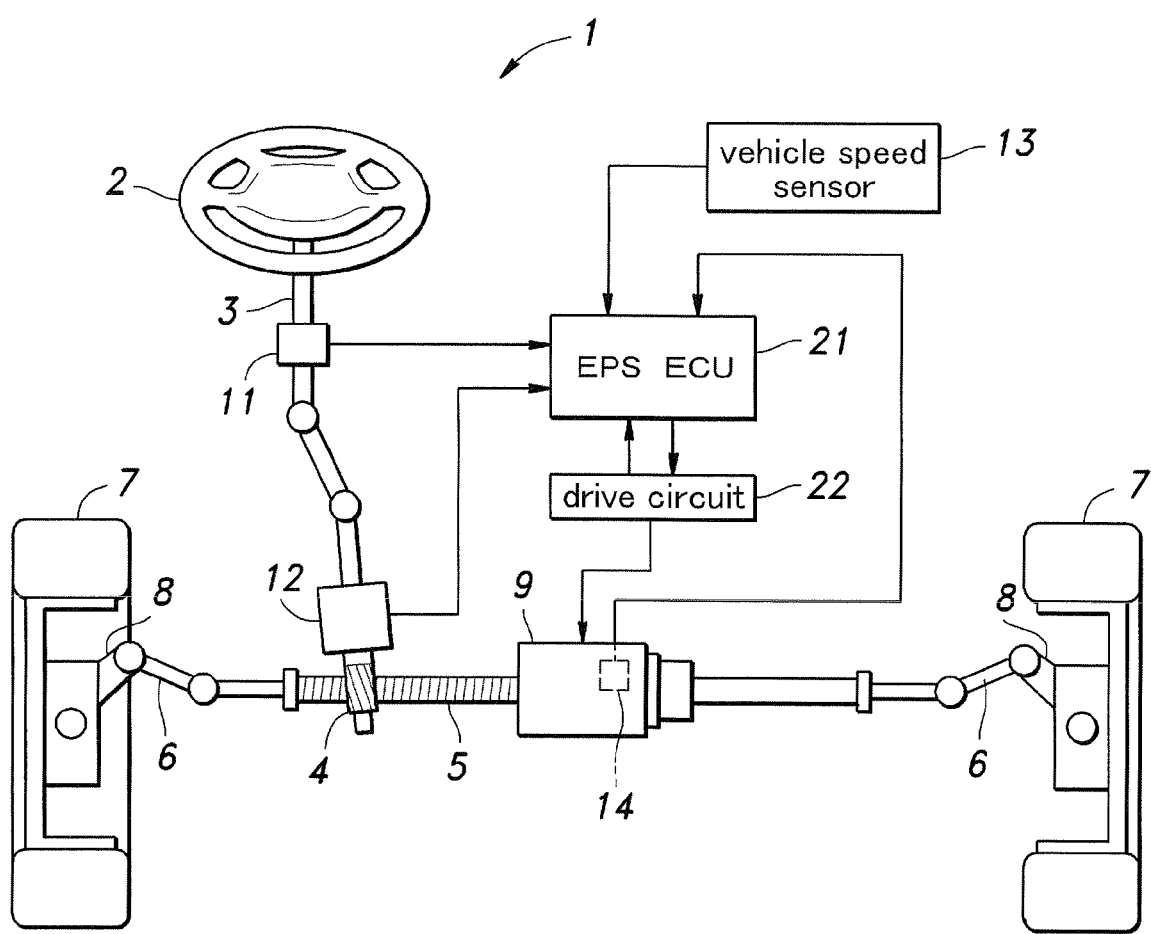
FIG. 1 is a simplified diagram illustrating an electric power steering system embodying the present invention.

FIG. 1 is a diagram showing an electric power steering (EPS) system embodying the present invention. This EPS system 1 includes a rack and pinion mechanism essentially consisting of a pinion 4 integrally connected to a steering wheel 2 in a rotationally fast manner via a steering shaft 3, and a rack shaft 5 that meshes with the pinion 4 and disposed in a laterally moveable manner. The two ends of the rack shaft 5 are connected to the knuckle arms 8 of the right and left front wheels 7, respectively, via corresponding tie rods 6 so that the front wheels 7 may be steered according to the angular movement of the steering wheel 2. Additionally, the rack shaft 5 is coaxially connected to a motor 9 that provides an assisting steering force for reducing the effort required to steer the front wheels 7 via the rack and pinion mechanism.

A steering angle sensor 11 for detecting a steering angle of the steering wheel 2 is provided on the steering shaft 3, and a steering torque sensor 12 for detecting a manual steering torque acting upon the pinion 4 is provided adjacent to the pinion 4. A vehicle speed sensor 13 for detecting a vehicle speed is mounted on a suitable part of the vehicle body. The electric motor 9 is provided with a resolver 14 for detecting the rotational angle of the motor 9.

The output signals of the steering angle sensor 11, steering torque sensor 12, vehicle speed sensor 13 and resolver 14 are forwarded to a steering control unit (EPS-ECU) 21 which is incorporated with a microcomputer, ROM, RAM, a peripheral circuit, an input/output interface and various drivers for the purpose of comprehensively controlling the operation of the EPS system 1. The EPS-ECU 21 determines a target control variable (target current) for controlling the operation of the electric motor 9 according to the output signals of the sensors 11 to 14, and forwards it to a drive circuit 22 of the electric motor 9. The drive circuit 22 typically consists of a FET bridge circuit, and supplies electric power to the electric motor 9 according to the target control variable determined by the EPS-ECU 21 so that the output torque of the electric motor 9 or the assist steering torque for steering operation is controlled as required.

Figure 2:
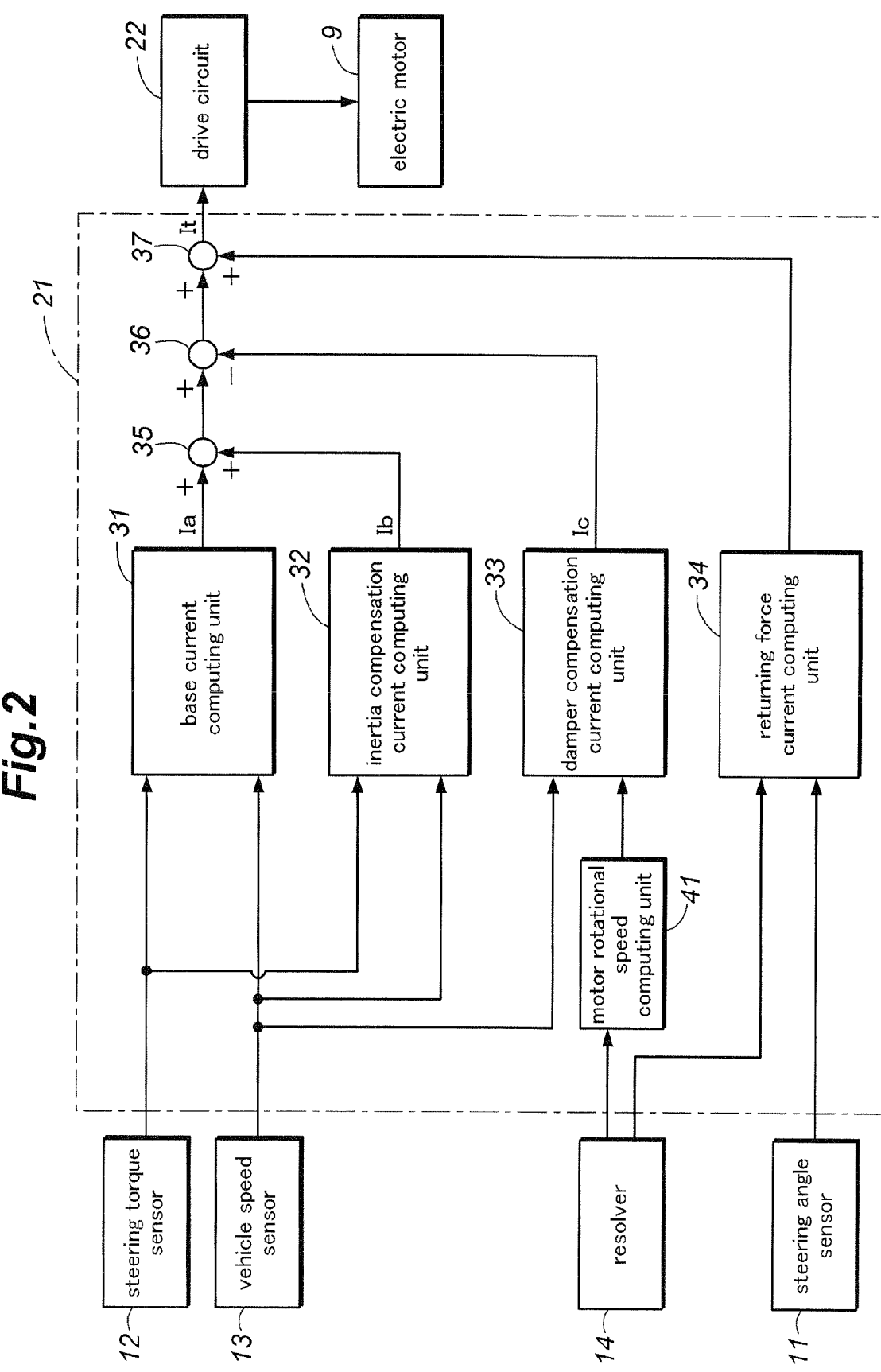
FIG. 2 is a block diagram showing a control arrangement for the electric power steering system shown in FIG. 1.

FIG. 2 is a simplified block diagram of the EPS-ECU 21 shown in FIG. 1.

The EPS-ECU 21 comprises a target control base value determining unit, such as, for example, a base current computing unit 31, for computing a target control base value, such as a base current Ia, an inertia compensation current computing unit 32 for computing an inertia compensation current Ib for canceling the moment of inertia of the electric motor 9 and steering mechanism, a damper compensation current computing unit 33 for computing a damper compensation current Ic for controlling the excessive transient response of the electric motor 9 from the vehicle speed sensor 13 and a correction value determining unit, such as, for example, a returning force current computing unit 34, for computing a correction value that modifies the force that tends to urge the steering wheel toward the neutral position thereof. The output end of the base current computing unit 31 is connected to an adder 35, a subtractor 36 and an adder 37 in series and in this order.

The base current computing unit 31 computes the base current Ia from the steering torque detected by the steering torque sensor 12 and the vehicle speed detected by the vehicle speed sensor 13 in a per se known manner.

The inertia compensation current computing unit 32 computes a time differentiated value of the steering torque detected by the steering torque sensor 12, and computes the inertia compensation current Ib from this time differentiated value of the steering torque and the vehicle speed detected by the vehicle speed sensor 13. The inertia compensation current Ib is forwarded to the adder 35 to be used for correcting the base current Ia.

The damper compensation current computing unit 32 computes a damper compensation current Ic according to the rotational speed computed by a motor rotational speed computing unit 41 (time differentiated value of the rotational angle of the electric motor 9 detected by the resolver 14) and the vehicle speed detected by the vehicle speed sensor 13 in a per se known manner. The damper compensation current Ic is forwarded to the substractor 36 to be used for correcting the base current Ia. In the EPS system 1, because the steering rotational speed of the steering wheel 2 is proportional to the rotational speed of the electric motor 9, a time differential value of the steering angle detected by the steering angle sensor 11 may also be used instead of the rotational speed of the electric motor 9.

The returning force current computing unit 34 computes a returning force current Id that corresponds to the returning force produced in dependence on the steering angle detected by the steering angle sensor 11. This returning force current Id is determined in such a manner as to take different values, at least within a certain range, depending on if the direction of rotation of the steering wheel detected by the steering angle sensor or the resolver 14 agrees with or disagrees from the direction of steering torque detected by the steering torque sensor 12. When the two directions agree with each other, it is called as a "normal steering". When the two directions disagree from each other, it is called a "return steering". A return steering occurs, for instance, when the vehicle operator applies a steering torque in a first direction (clockwise, for instance), but steering wheels turns in an opposite section direction (counter clockwise, for instance) owing to the road reaction.

The output of the last adder 37 is forwarded to the drive circuit 22.

Figure 3:
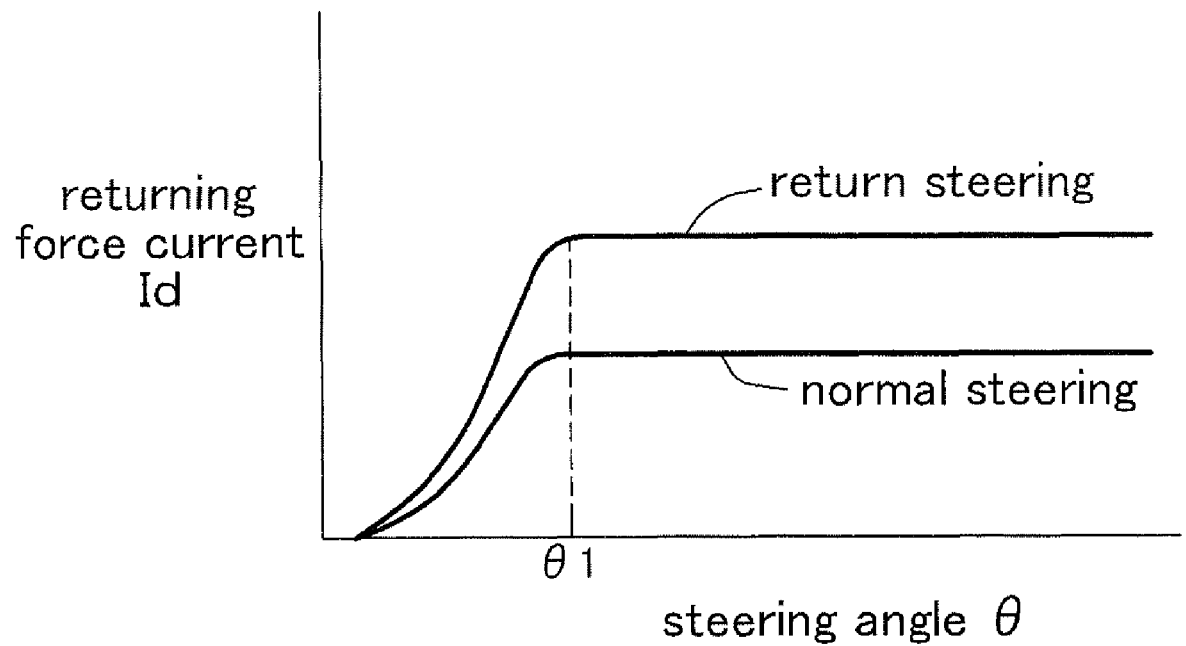
FIG. 3 is a graph showing the relationship between the correction gain for returning force current and steering angle.

As shown by the graph of FIG. 3, the returning force current Id is determined in such a manner as to progressively increase with an increase in the steering angle θ as long as the steering angle θ is smaller than a saturation value θ1, and becomes constant when the steering angle θ is greater than the saturation value θ1 in both the normal steering and return steering. However, the returning force current Id for the return steering is generally greater than that for the normal steering in both the region where the current value progressively increases with an increase in the steering angle and the region where the current value stays constant. Thereby, the returning force is reduced when the steering torque is applied to the steering wheel in the same direction as the rotational direction of the steering wheel (whereby the returning force opposes the steering effort by the vehicle operator to a lesser extent) so that the steering feel can be improved (by permitting the vehicle operator to turn the wheel with a relatively small resistance) while maintaining the returning action of the steering wheel.

Figure 4:
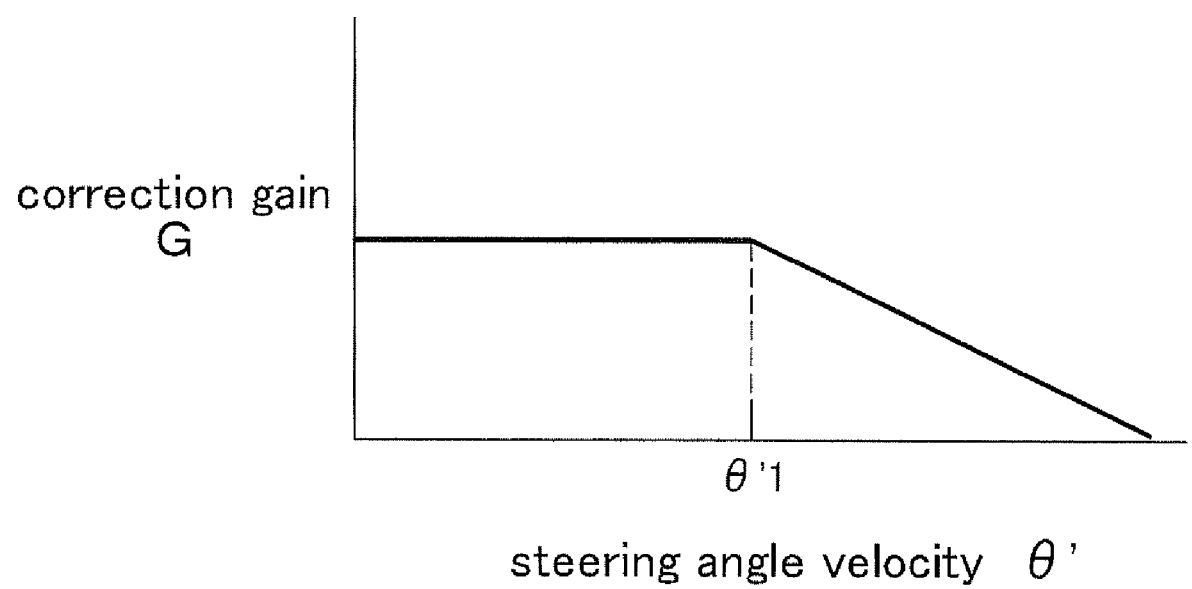
FIG. 4 is a graph showing the relationship between a correction gain G and steering angle velocity.

The returning force current computing unit 34 may be configured to multiply a correction gain G that changes with the steering angle velocity to the returning force current Id obtained according to the steering angle. The correction gain G may be determined so as to decrease with an increase in the steering angle velocity θ' at least within a prescribed range. For instance, as shown in FIG. 4, the correction gain G may be determined so as to decrease with an increase in the steering angle velocity θ' when the steering angle velocity θ' is greater than a prescribed value θ'1. Thereby, when it is determined that the vehicle operator is exerting some effort to turn the steering wheel (as evidenced by a rapid rotation of the steering wheel by the vehicle operator), the returning force of the steering wheel is reduced further so that the steering wheel can be turned with a relatively small effort, and this improves the steering feel experienced by the vehicle operator.

The computation of the current values Ia to Id in the current computing units 31 to 34 may be performed by using any known method such as algebraic formulas and maps.

Figure 5:
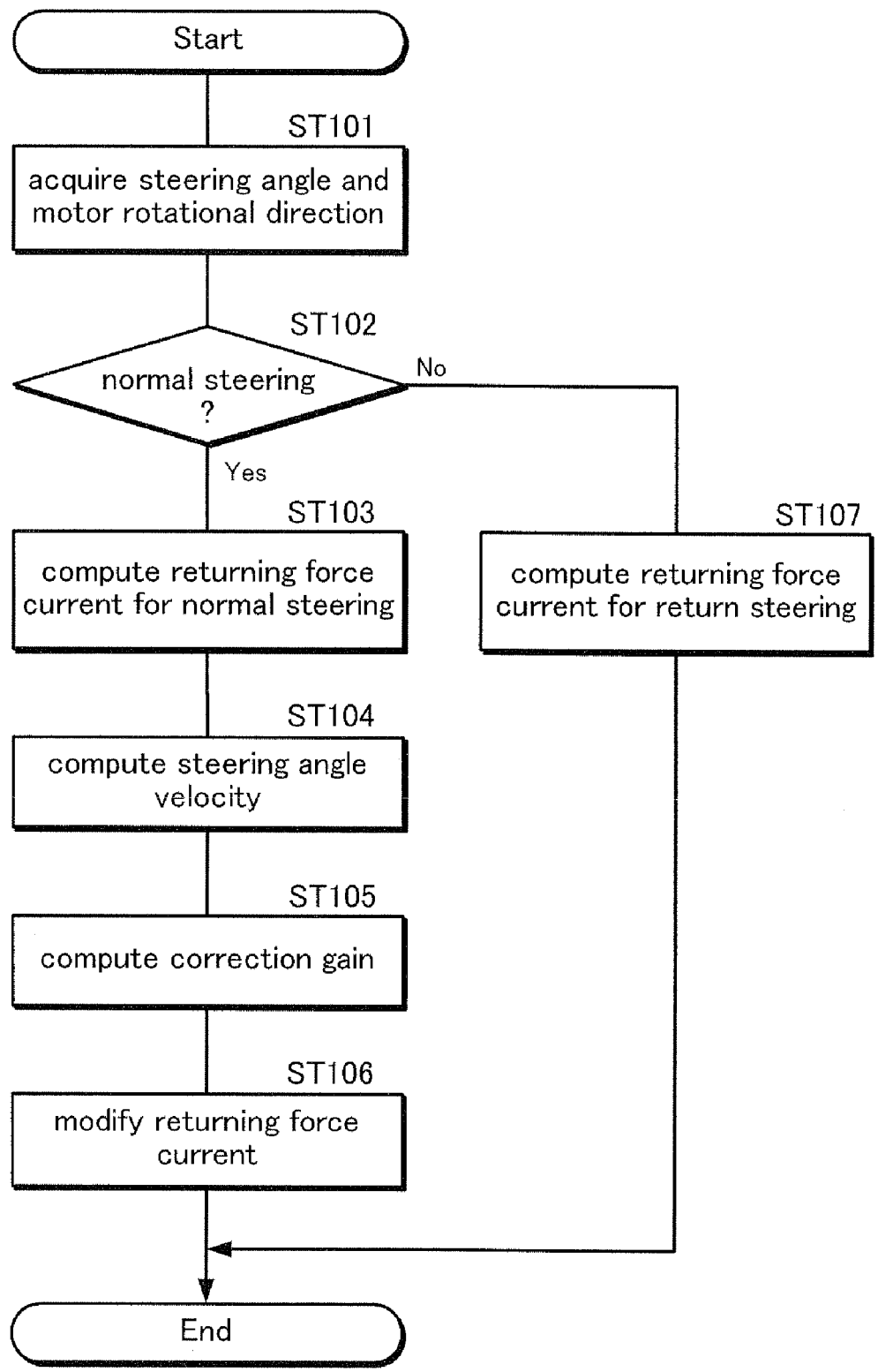
FIG. 5 is a flowchart showing a control process for computing the returning force current.

FIG. 5 is a flowchart showing the process of computing the returning force current in the returning force current computing unit 34 which is illustrated in FIG. 2.

The returning force current computing unit 34 acquires information on the steering angle from the steering angle sensor 11 and information on the rotational direction of the electric motor 9 from the resolver 14 (ST101), and determines if the steering condition is either the normal steering or the return steering (ST102). In case of the normal steering (yes), the returning force current computing unit 34 obtains the returning force current Id for the normal steering by looking up the map illustrated in FIG. 3 for the given steering angle θ (ST103).

The returning force current computing unit 34 then computes the steering angle velocity (time differential value of the steering angle) from the steering angle information (ST104), and obtains the correction gain G by looking up the map illustrated in FIG. 4 for the given steering angle velocity θ' (ST105). Thereafter, the returning force current computing unit 34 corrects the returning force current Id by multiplying the correction gain G to it (ST106), and outputs the product.

If the return steering is detected in step ST102 instead of the normal steering, the returning force current computing unit 34 obtains the returning force current Id for the return steering by looking up the map illustrated in FIG. 3 for the given steering angle θ (ST107), and outputs the result.

In the steering control system 21 described above, as shown in FIG. 2, with respect to the base current Ia computed by the base current computing unit 31, the inertia compensation current Ib is added in the adder 35, the damper compensation current is subtracted in the subtractor 36, and the returning force current Id is added in the adder 37. The corrected base current which is finally outputted from the adder 37 is forwarded to the drive circuit 22 as the target current It, and the motor 9 is controlled according to this current.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An electric power steering system, comprising:
   a steering mechanism for converting a rotational movement of a steering wheel to a steering movement of a road wheel;
   a steering torque sensor for detecting a steering torque applied to the road wheel;
   an electric motor for providing an assisting force for causing the steering movement of the road wheel; and
   a control unit for providing a control variable for the electric motor, the control unit comprising:
   a target control base value determining unit for determining a target control base value for the electric motor at least according to a steering torque applied to the steering wheel,
   a correction value determining unit that modifies the target control base value so as to determine a returning force that urges the steering wheel toward a neutral position, and forwards the modified target control base value to a drive unit for the electric motor,
   wherein the correction value determining unit modifies the target control base value so as to cause the electric motor to produce a relatively small returning force when a rotational direction of the steering wheel agrees with a direction of the steering torque applied to the road wheel, and a relatively large returning force when a rotational direction of the steering wheel disagrees from a direction of the steering torque applied to the road wheel; and
   wherein the returning force current computing unit is configured such that the returning force produced by the electric motor is reduced with an increase in a steering angle velocity of the steering wheel when a rotational direction of the steering wheel agrees with a direction of the steering torque applied to the road wheel at least in a range of the steering angle velocity.

2. The electric power steering system according to claim 1, wherein the system further comprises a steering angle sensor for detecting a steering angle of the steering wheel, and the correction value determining unit is configured such that the returning force produced by the electric motor is substantially proportional to the steering angle of the steering wheel when the steering angle is smaller than a prescribed value, and is substantially constant when the steering angle is greater than the prescribed value.

3. The electric power steering system according to claim 1, wherein the correction value determining unit is configured such that the returning force produced by the electric motor is reduced with an increase in a steering angle velocity of the steering wheel when a rotational direction of the steering wheel agrees with a direction of the steering torque applied to the road wheel and only when the steering angle velocity is greater than a prescribed value.

4. The electric power steering system according to claim 1, wherein the correction value determining unit modifies the target control base value so as to cause the electric motor to produce a returning force both when a rotational direction of the steering wheel agrees with a direction of the steering torque applied to the road wheel and when a rotational direction of the steering wheel disagrees from a direction of the steering torque applied to the road wheel.

* * * * *